(12) United States Patent
Eriksson et al.

(10) Patent No.: US 12,337,330 B2
(45) Date of Patent: Jun. 24, 2025

(54) BEARING ASSEMBLY FOR CONE CRUSHER

(71) Applicant: SANDVIK SRP AB, Svedala (SE)

(72) Inventors: Fredrik Eriksson, Malmo (SE); Jan Johansson, Lomma (SE); Sofie Nyman Gunnarsson, Malmo (SE)

(73) Assignee: Sandvik SRP AB, Svedala (SE)

( * ) Notice: Subject to any disclaimer, the term of this patent is extended or adjusted under 35 U.S.C. 154(b) by 382 days.

(21) Appl. No.: 17/311,917

(22) PCT Filed: Dec. 10, 2018

(86) PCT No.: PCT/EP2018/084146
§ 371 (c)(1),
(2) Date: Jun. 8, 2021

(87) PCT Pub. No.: WO2020/119878
PCT Pub. Date: Jun. 18, 2020

(65) Prior Publication Data
US 2022/0023869 A1    Jan. 27, 2022

(51) Int. Cl.
*B02C 2/04* (2006.01)
*F16C 17/12* (2006.01)

(52) U.S. Cl.
CPC .............. *B02C 2/047* (2013.01); *F16C 17/12* (2013.01)

(58) Field of Classification Search
None
See application file for complete search history.

(56) References Cited

U.S. PATENT DOCUMENTS 6,328,237 B1 *  12/2001  Thysell ................... B02C 2/047
                                                    241/213

FOREIGN PATENT DOCUMENTS

| CN | 108786987 A | 11/2018 |
|----|-------------|---------|
| EP | 2689850 A1 | 1/2014 |
| EP | 2689851 A1 | 1/2014 |
| WO | 2017181234 A1 | 10/2017 |

* cited by examiner

*Primary Examiner* — Jared O Brown
(74) *Attorney, Agent, or Firm* — Corinne R. Gorski

(57) ABSTRACT

A bearing assembly for a cone crusher includes an inner slide bearing, an eccentric sleeve and an outer slide bearing arranged for supporting a lower portion 5 of a crushing head shaft. The inner slide bearing has a diameter D1 and an axial height H1 being defined from the inner slide bearing upper end to the inner slide bearing lower end. The outer slide bearing 40 has a diameter D2 and an axial height H2 being defined from the outer slide bearing upper end to the outer slide bearing lower end 40b. A ratio of the inner slide bearing axial height and its diameter H1/D1 is in the range of 0.95 to 1.20. A cone crusher including the bearing assembly is also provided.

13 Claims, 4 Drawing Sheets

BEARING ASSEMBLY FOR CONE CRUSHER

RELATED APPLICATION DATA

This application is a § 371 National Stage Application of PCT International Application No. PCT/EP2018/084146 filed Dec. 10, 2018.

FIELD OF INVENTION

The present invention relates to a bearing assembly for a cone crusher. Further the present invention relates to a cone crusher.

BACKGROUND

A cone crusher normally has a pressure relief system that vertically can adjust and control the size of the crushing gap by means of a hydraulic fluid. This is referred to as a hydroset assembly.

Cone crushers are used for crushing ore, mineral and rock material to smaller sizes. A gyratory crusher is an example of a cone crusher. Typically, the crusher comprises a crushing head mounted upon an elongate main shaft. A first crushing shell is mounted on the crushing head and a second crushing shell is mounted on a frame such that the first and second crushing shells define together a crushing gap through which the material to be crushed is passed. A driving device is arranged to rotate an eccentric assembly about the lower portion of the shaft, so as to cause the crushing head to perform a gyratory pendulum movement and to crush the material introduced in the crushing gap.

EP 2 689 850 discloses an exemplary cone crusher. The crusher has shorter bearings and a relatively high hydroset assembly connecting to the frame of the crusher.

In cone crushers the gyratory pendulum movement of the crushing head is supported by a top bearing into which an upper end of the main shaft is journaled, and lower slide bearings positioned below the crushing head into which a lower end of the main shaft is journaled. The lower bearings are arranged close to the hydroset that by a pressure relief system regulates the size of the crushing gap. The lower slide bearings support the main shaft.

There is a need to make a more robust crusher that can stand higher forces while not making the outer dimensions of the crusher larger. The lower slide bearings need to have a specific height to properly support the main shaft and the crusher. Further, there is a need for adapting the cone crusher and the hydroset assembly to a more robust crusher.

Thus, what is required is a bearing assembly and a cone crusher that addresses the above problems.

SUMMARY

It is an object of the present invention to provide a bearing assembly being able to stand larger forces. Another object is to securely arrange the slide bearings in connection to the hydroset assembly.

The objectives are achieved by providing longer bearings, without making the crusher itself higher in axial direction. Further the objectives are achieved by providing the crusher with a hydroset assembly having an adapted connection to the crusher frame, while also keeping the crusher frame securely in place.

According to a first aspect of the present invention there is provided a bearing assembly for a cone crusher comprising an inner slide bearing, an eccentric sleeve and an outer slide bearing for supporting a lower portion of a crushing head shaft. The inner slide bearing has a diameter and an axial height being defined from the inner slide bearing upper end to the inner slide bearing lower end and the outer slide bearing has a diameter and an axial height being defined from the outer slide bearing upper end to the outer slide bearing lower end. The ratio of the inner slide bearing axial height and its diameter is in the range of 0.95 to 1.20. This provides for a firm support of a robust crusher. Thus, the support is strengthened, while still having the same crusher height.

Preferably, the ratio of the inner slide bearing axial height and its diameter (H1/D1) is in the range of 0.99 to 1.15. This enables a robustness though involving limited alterations.

Optionally, the ratio of the inner slide bearing axial height and its diameter (H1/D1) is in the range of 1.00 to 1.10. This enables a robustness with restricted modifications.

Preferably, the ratio of the outer slide bearing axial height and its diameter (H2/D2) is in the range of 0.50 to 0.70. This improves the slide bearing functionality with respect to a temperature increase in the slide bearings.

Optionally, the ratio of the outer slide bearing axial height and its diameter (H2/D2) is in the range of 0.55 to 0.65. This meliorates the use of the slide bearing.

Optionally, the ratio of the outer slide bearing axial height and its diameter (H2/D2) is in the range of 0.60 to 0.64. The robustness is due to a limited change in temperature ($\Delta t$).

Optionally, the ratio of the axial height of the inner slide bearing and the outer slide bearing (H1/D2) is in the range of 1.00 to 1.15. By revamping the slide bearing and the outer slide bearing a smoother functionality is enabled.

According to a second aspect of the present invention there is provided a cone crusher comprising a bearing assembly. The cone crusher comprises: a crushing head on which a first crushing shell is mounted, the crushing head mounted on a crushing head shaft that is arranged on a top spider; a frame on which a second crushing shell is mounted, which second crushing shell defines, together with a first crushing shell, a crushing gap; the frame having a lowermost part arranged in connection to a hydroset assembly with an axial length having a specific height; a piston hydraulically moving a crushing head shaft by means of a hydraulical fluid assembly in order to control the crushing gap; an upper end of the hydroset assembly with a vertical flange and a horizontal flange, the flanges supporting a lowermost part of the frame; the vertical flange has a vertical length from the upper end to the lower end; the horizontal flange has a horizontal length from the outer end to the inner end; wherein the vertical flange lower end and the horizontal flange inner end has a common intersection; and wherein the ratio of the vertical length of the vertical flange and the horizontal length of the horizontal flange is equal to or below 1. This makes the height of the hydroset assembly more space efficient, while still supporting the crushing head shaft in the same rigid manner.

Preferably, the ratio of the length of the vertical flange and the horizontal length of the horizontal flange is in the range 0.1 to 0.5. This supports a smoother functionality of the crushing head shaft.

Optionally, the ratio of the length of the vertical flange and the horizontal length of the horizontal flange is in the range 0.2 to 0.4. This enable enables movement of the crushing head shaft in a convenient way.

Preferably, the ratio of the length of the vertical flange and the height of the hydroset assembly is equal to or below 0.1, enabling a stable functionality of the hydroset.

Optionally, the ratio of the length of the vertical flange and the height of the hydroset assembly is in the range 0.03 to 0.05. This limited ratio still enables the functionality of the hydroset assembly.

Also, the two flanges are perpendicular to each other. This generates an efficient assembly of the hydroset.

BRIEF DESCRIPTION OF DRAWINGS

A specific implementation of the present invention will now be described by way example only and with reference to the following drawings in which.

DETAILED DESCRIPTION

Figure 1:
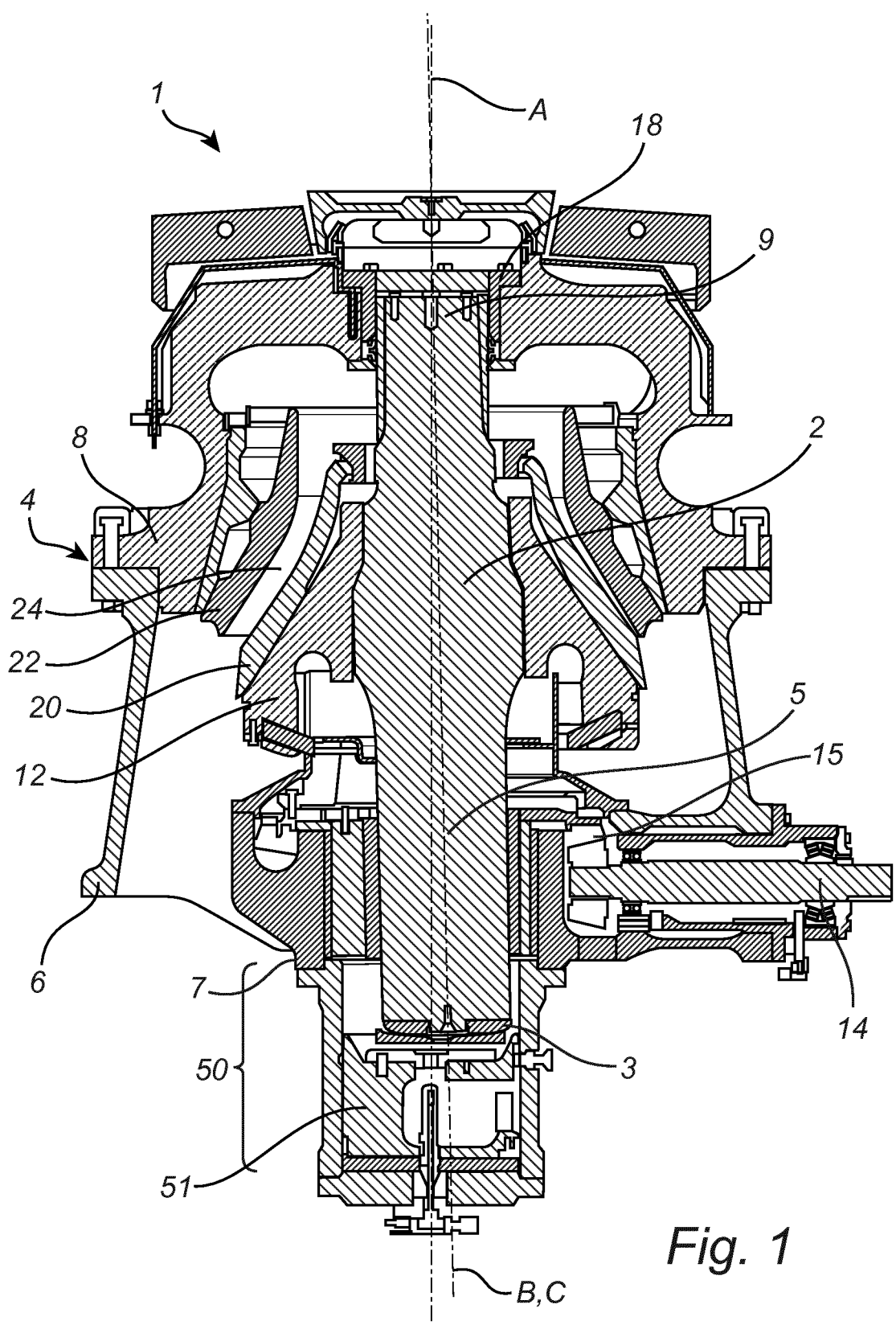
FIG. 1 is a cross-sectional side view of a cone crusher having a main shaft supported at its lower end by slide bearings.

FIG. 1 discloses a cone crusher 1 having a vertical crushing head shaft 2 and a frame 4 with a bottom part 6 and a top part 8. The crushing head shaft 2 has a lowermost end 3 arranged in connection to a hydroset assembly 50 and is carried at its uppermost end 9 in a top bearing 18 in the frame top part 8. A crushing head 12 is mounted to the upper portion of the head shaft 2 is. A lowermost part 7 of the frame 4 is also arranged in connection to the hydroset assembly 50.

An eccentric sleeve 10 is arranged around the lower portion 5 of the head shaft 2. A drive shaft 14 is arranged to rotate the eccentric sleeve 10 by means of a motor (not shown) and a gear rim 15 mounted on the eccentric sleeve 10. When the crusher operates, the drive shaft 14 rotates the eccentric sleeve 10 so the crushing head shaft 2 and the crushing head 12 will execute a gyrating movement.

The crushing head shaft 2 is at its lower portion 5 radially supported in the eccentric sleeve 10 via an inner bearing 30, which allows the eccentric sleeve 10 to rotate around the crushing head shaft 2. The inner bearing 30 is arranged between the head shaft 2 and the eccentric sleeve 10. Further, the eccentric sleeve 10 is radially supported via an outer bearing 40, which allows the eccentric sleeve 10 to rotate in the frame bottom part 6. The outer bearing 40 is thus arranged radially outwards of the eccentric sleeve 10.

Figure 4:
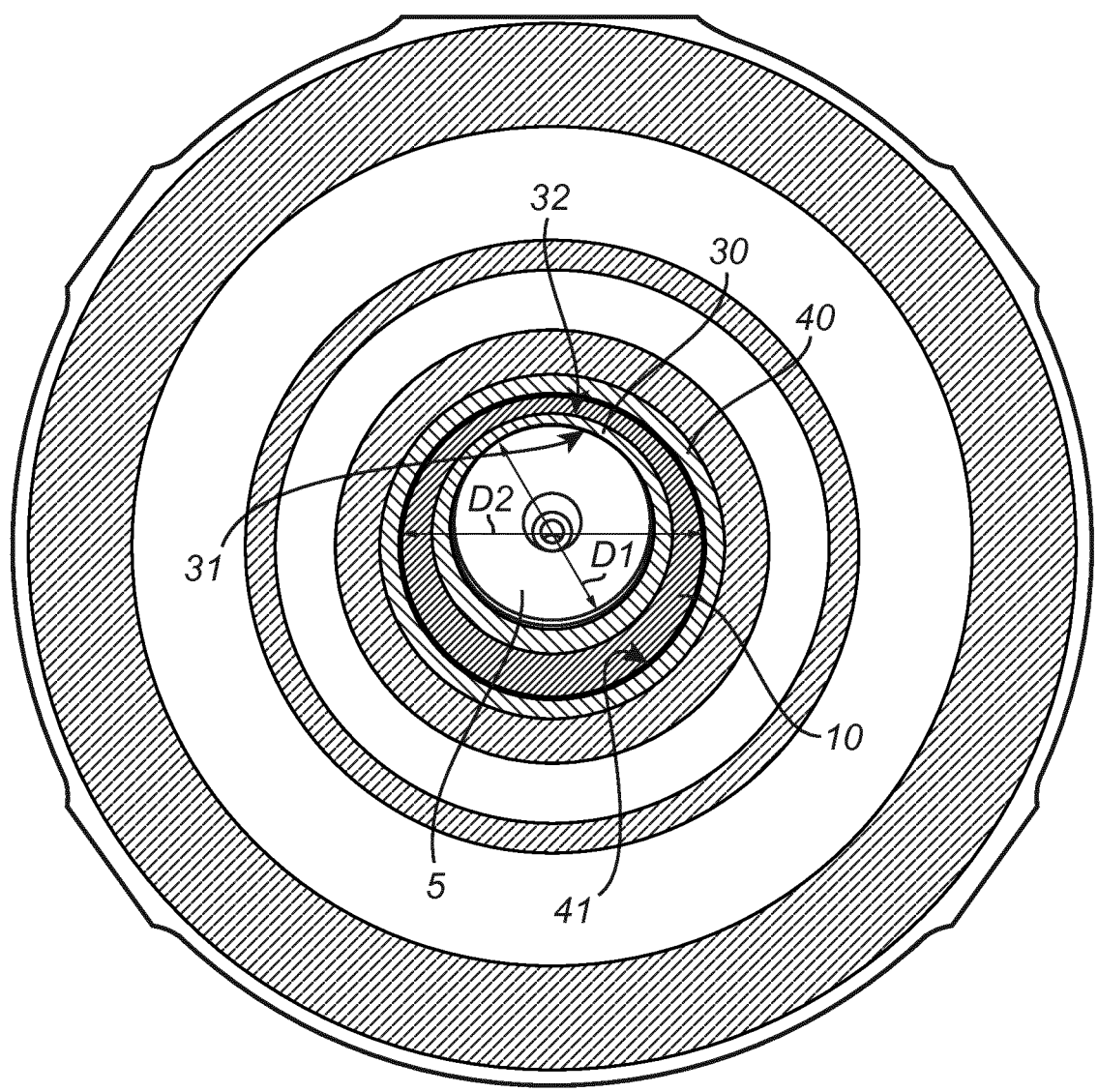
FIG. 4 is a cross-sectional view taken along the section X-X of FIG. 2.

The crusher 1 has a central axis A that is defined by the centre point of the diameter D2, which is the inner diameter of the outer bearing 40 measured from an outer bearing inner slide surface 41. This is further shown in FIG. 2 and FIG. 4. The outer side of the eccentric sleeve 10 is arranged closely to the outer bearing slide surface 41, via an oil film or a so called slide surface. The inner diameter of the eccentric sleeve 10 is arranged around a second axis B. The inner bearing 30 has a circular cylindrical outer surface 32 close to the inner surface of the eccentric sleeve 10. The inner bearing has an inner diameter D1 defined as an inner bearing inner slide surface 31. This slide surface 31 is with the help of an oil film arranged closely to the head shaft 2. The inner bearing slide surface 31 and the head shaft 2 is rotating around a third axis C. The third axis C coincides with the centre point of the inner bearing diameter D1.

The outer slide bearing 40 defines an eccentric axis of rotation A (which is the central axis of the crusher), about which the eccentric sleeve 10 is arranged to rotate. The eccentric axis of rotation A also defines the centre of gyratory motion of the crushing head 12. The eccentric axis of rotation A is fixed relative to the frame 4.

Where the eccentric sleeve 10 on the inside is in contact with the outer surface 32 of the inner bearing 30 another diameter is defined, an eccentric sleeve inner diameter. The centre point of this diameter defines the second axis B.

The inner slide bearing 30 defines a crushing head axis of rotation C, about which the crushing head 12 is arranged to rotate. The crushing head axis of rotation C is fixed relative to the eccentric sleeve 10, and is inclined and/or offset relative to the second axis B and relative to the eccentric axis of rotation A. This results in the crushing head axis C gyrating about the second axis B and about the eccentric axis A when the crusher is operating.

An inner crushing shell 20 is mounted on the crushing head 12. An outer crushing shell 22 is mounted on the frame top part 8. A crushing gap 24 is formed between the two crushing shells 20, 22. When the crusher 1 operates, material is crushed between the inner crushing shell 20 and the outer crushing shell 22. This is the result of the gyrating movement of the crushing head 12, during which movement the two crushing shells approach one another along a rotating generatrix and move away from one another along a diametrically opposed generatrix.

Figure 2:
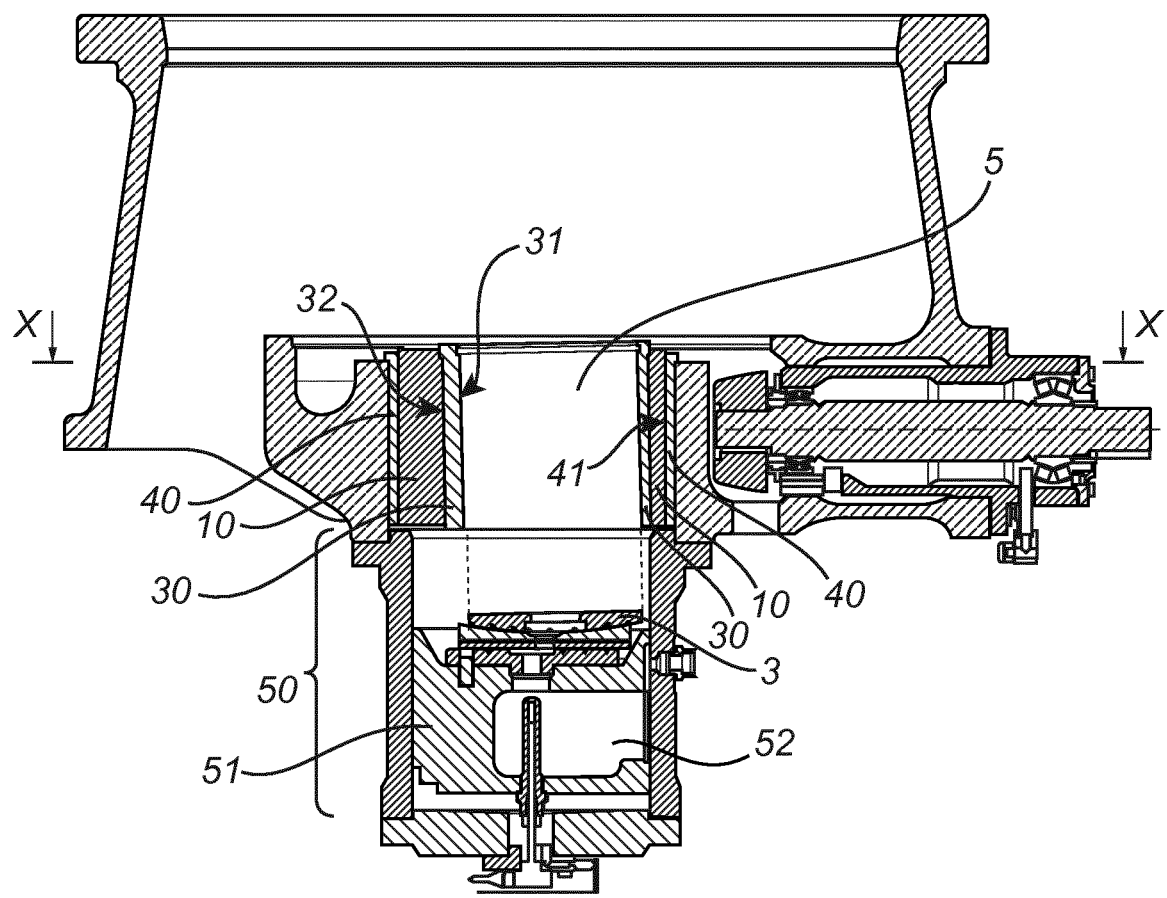
FIG. 2 is a magnified view of the cross-sectional side view of FIG. 1 with slide bearings and hydroset assembly.

FIG. 2 is a magnified view of the lower part of the cone crusher disclosing the slide bearings and the hydroset assembly. The lowermost end 3 of the head shaft 2 is arranged above a hydroset piston 51 that is part of the hydroset assembly 50. The vertical position of the hydroset piston 51 and thus the head shaft 2 may be hydraulically adjusted by controlling the amount of hydraulic fluid in a hydraulic fluid space 52 in the lower part of the hydroset assembly 50. In this way, the width of the crushing gap 24 may be adjusted. The height of the hydroset assembly 50 is defined as H, which is the vertical travelling distance of the hydroset piston 51.

Figure 3:
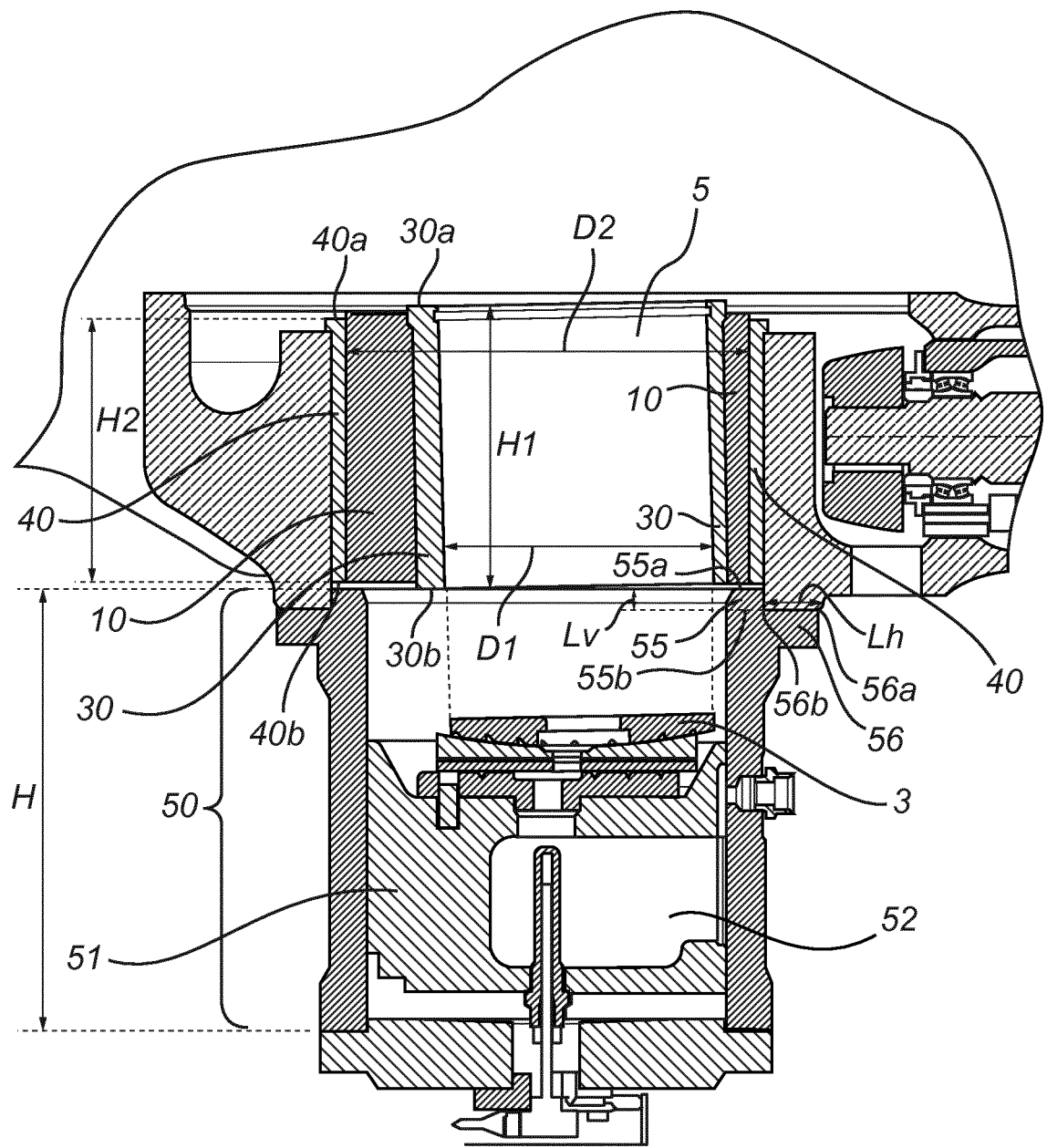
FIG. 3 is a further magnified view of the cross-sectional side view of FIG. 1 with slide bearings and hydroset assembly.

FIG. 3 discloses the lower part of the cone crusher in a more magnified view. The inner bearing 30 has an upper end 30a and a lower end 30b defining an axial height H1 in a mainly vertical direction. The outer bearing 40 has an upper end 40a and a lower end 40b defining an axial height H2 in a mainly vertical direction. The inner diameters of the inner bearing 30 and the outer bearing 40 are defined by D1 and D2, respectively. The upper end of the hydroset assembly 50 has a vertical flange 55 and a horizontal flange 56, which are perpendicular. The flanges 55, 56 support a lowermost part 7 of the frame 4. The length of the vertical flange 55 is defined as Lv. The upper end of the vertical flange is defined as 55a and is also the upper end of the hydroset assembly 50. The lower end of the vertical flange is defined as 55b and is in line with the upper side of the horizontal flange 56. The length of the vertical flange Lv is defined from the upper end of the vertical flange 55a to the lower end of the vertical flange 55b. So, the vertical length Lv is also a mainly axial length. The length of the horizontal flange 56 is defined as Lh. The outer end of the vertical flange being defined as 56a. The inner end of the horizontal flange is defined as 56b and is the point where the horizontal flange 56 intersects with the lower end of the vertical flange 55. The length of the horizontal flange Lh is defined from the outer end of the horizontal flange 56a to the inner end of the horizontal flange 56b.

The relation between the two flanges is so that the horizontal flange 56 is at least twice as long as the vertical flange 55. The length Lv of the vertical flange 55 is preferably between 10% and 50% of the length Lh of the horizontal flange 56. More specifically this value may be 20%, 30% or 40%.

The length Lv of the vertical flange 55 is not more than 10% of the entire axial length, i.e. the height H of the hydroset assembly 50. This value is normally less than 5%. It can be 1%, 2%, 3% or 4%.

The inner slide bearing axial height H1 and the inner diameter of the inner slide bearing D1 has approximately the same value. D1 might be slightly larger such that H1 equals 95%, 97% or 99% of D1. H1 and D1 might be equal so the ratio is 1. H1 might also be somewhat larger than D1. H1 may be 5%, 10%, 15% or 20% larger than D1.

The inner diameter of the outer slide bearing D2 is approximately twice the size of the outer slide bearing axial height H2. The axial height H2 is normally between 50% to 70% of the outer slide bearing diameter D2. This value can also be 55%, 60% or 65%. Even more specific it can be 62% or 64%.

The relation between the inner slide bearing axial height H1 and the outer slide bearing axial height H2 is close to 1. H1 is normally somewhat larger than H2, so that the ratio H1/H2 is between 1.05 and 1.15, more specifically it can be 1.07 or 1.10.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims

The invention claimed is:

1. A bearing assembly for a cone crusher comprising:
an inner slide bearing having an inner slide bearing upper end and an inner slide bearing lower end;
an eccentric sleeve; and
an outer slide bearing arranged for supporting a lower portion of a crushing head shaft, the outer slide bearing having an outer slide bearing upper end and an outer slide bearing lower end wherein the inner slide bearing has an inner diameter (D1) and an axial height (H1) being defined from the inner slide bearing upper end to the inner slide bearing lower end, the outer slide bearing having an inner diameter (D2) and an axial height (H2) being defined from the outer slide bearing upper end to the outer slide bearing lower end, and wherein a ratio of the inner slide bearing axial height to the inner slide bearing inner diameter (H1/D1) is in a range of 0.95 to 1.20, and wherein a ratio of the outer slide bearing axial height to the outer slide bearing inner diameter (H2/D2) is in a range of 0.50 to 0.70.

2. The bearing assembly as claimed in claim 1, wherein the ratio of the inner slide bearing axial height to the inner slide bearing inner diameter (H1/D1) is in a range of 0.99 to 1.15.

3. The bearing assembly as claimed in claim 1, wherein the ratio of the inner slide bearing axial height to the inner slide bearing inner diameter (H1/D1) is in a range of 1.00 to 1.10.

4. The bearing assembly as claimed in claim 1, wherein a ratio of the outer slide bearing axial height to the outer slide bearing inner diameter (H2/D2) is in a range of 0.55 to 0.65.

5. The bearing assembly as claimed in claim 1, wherein a ratio of the outer slide bearing axial height to the outer slide bearing inner diameter (H2/D2) is in a range of 0.60 to 0.64.

6. The bearing assembly as claimed in claim 1, wherein a ratio of the axial height of the inner slide bearing to the outer slide bearing (H1/H2) is in a range of 1.00 to 1.15.

7. A cone crusher comprising a bearing assembly as claimed in claim 1.

8. The cone crusher as claimed in claim 7, further comprising:
a crushing head on which a first crushing shell is mounted, the crushing head being mounted on a crushing head shaft;
a frame on the a second crushing shell is mounted, which second crushing shell defines, together with the first crushing shell, a crushing gap, the frame having a lowermost part arranged in connection to a hydroset assembly with an axial length having a specific height;
a piston arranged to hydraulically move the crushing head shaft by means of a hydraulic fluid assembly in order to control the crushing gap; and
an upper end of the hydroset assembly having a vertical flange and a horizontal flange, the vertical and horizontal flanges supporting the lowermost part of the frame, wherein the vertical flange has a vertical length from an upper end to a lower end, and wherein the horizontal flange has a horizontal length from an outer end to an inner end, wherein the vertical flange lower end and the horizontal flange inner end intersect, and wherein a ratio of the vertical length of the vertical flange to the horizontal length of the horizontal flange is equal to or below 1.

9. The cone crusher as claimed in claim 8, wherein the ratio of the vertical length of the vertical flange to the horizontal length of the horizontal flange is in the range 0.1 to 0.5.

10. The cone crusher as claimed in claim 8, wherein the ratio of the vertical length of the vertical flange to the horizontal length of the horizontal flange is in the range 0.2 to 0.4.

11. The cone crusher as claimed in claim 8, wherein a ratio of the vertical length of the vertical flange to the specific height of the hydroset assembly is equal to or below 0.1.

12. The cone crusher as claimed in claim 8, wherein the ratio of the vertical length of the vertical flange to the specific height of the hydroset assembly is in a range of 0.03 to 0.05.

13. The cone crusher as claimed in claim 8, wherein the vertical and horizontal flanges are perpendicular to each other.

* * * * *